United States Patent [19]
Wilke

[11] 3,910,311
[45] Oct. 7, 1975

[54] PRESSURE COMPENSATED CONTROL VALVE

[75] Inventor: Raud A. Wilke, Brookfield, Wis.

[73] Assignee: Koehring Company, Milwaukee, Wis.

[22] Filed: Aug. 26, 1974

[21] Appl. No.: 500,747

[52] U.S. Cl. ............... 137/596; 137/102; 91/446; 137/596.12
[51] Int. Cl.² ........................................ F16K 11/00
[58] Field of Search . 137/102, 596, 596.12, 596.13, 137/625.68, 613; 91/447, 446

[56] References Cited
UNITED STATES PATENTS
2,946,347 7/1960 Ruhl ............................. 137/612.1
3,136,328 6/1964 Hipp ............................. 137/596.13

*Primary Examiner*—William R. Cline
*Assistant Examiner*—H. Jay Spiegel
*Attorney, Agent, or Firm*—James E. Nilles

[57] ABSTRACT

A pressure compensated, directional control valve includes a manually movable control member for selectively communicating an inlet passage with either one of a pair of service passages for flow of supply of pressure fluid thereto at a rate determined by the extent the control member is displaced from its neutral position, and wherein a pair of pressure compensating mechanisms are incorporated directly in the control member to maintain the selected supply flow rate and the exhaust rate, despite variations in load on the controlled motor or in the pressure of supply fluid entering the valve inlet. Each of the pressure compensating mechanisms acts to compensate the fluid flow being delivered to the fluid motor in one direction of operation and to compensate the pressure being returned from the fluid motor in the other direction of operation. The valve is arranged for use in an assembly including a multiplicity of such valves to control a multiplicity of independent functions.

20 Claims, 10 Drawing Figures

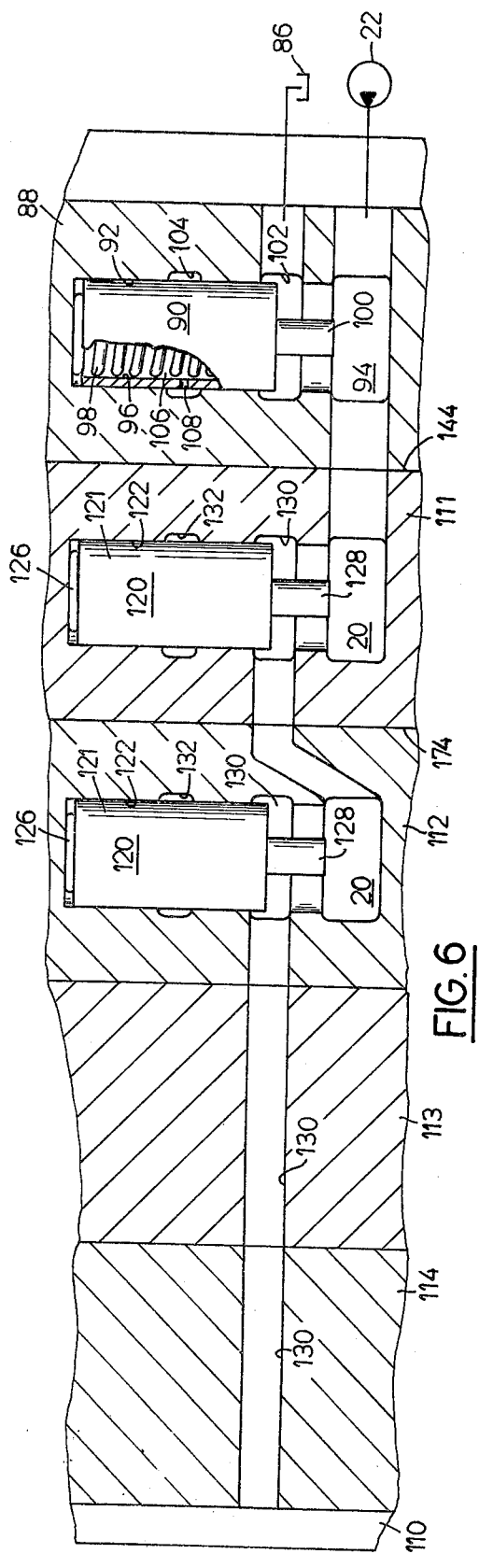

PRESSURE COMPENSATED CONTROL VALVE

BACKGROUND OF THE INVENTION

This invention relates to pressure compensated control valves for controlling reversible fluid motors and, more particularly, to a control valve in which both the fluid being delivered and the fluid being returned from the fluid motor are pressure compensated to maintain the delivery and return flow rates at a selected value independently of variations of pressure in the fluid supply or in the load upon the governed motor.

In prior valve constructions the delivery of fluid pressure to a fluid pressure motor has been controlled to maintain a constant flow rate by means of pressure compensating devices associated with each of the service ports separate from the valve control spool or valve control member. In valves of the type having a pair of service ports and a pair of return ports it has been common to use a single pressure compensating device in addition to the valve control spool for controlling the delivery of fluid to both of the service ports. Also in such valves when an attempt has been made at controlling the return fluid pressure it has been accomplished with a single pressure compensating device separate from the control spool associated with one of the return ports. Such arrangements are usually satisfactory for the operation of devices in which the load on the motor being operated is always in the same direction. However, in the case of reversible fluid motors in which the direction of the load may change they are not satisfactory, since separate pressure compensating devices must be provided, not only for the delivery of fluid to the service ports, but also a separate pressure compensating device is required for each of the return ports. Moreover, in such valves the pressure compensating devices are located separately from the control spool and require, not only larger valve bodies, but also more complex flow circuits.

SUMMARY OF THE INVENTION

The present invention contemplates a fluid pressure control valve manually operable to control the direction of operation of a motor by communicating an inlet passage with a selected one of a pair of service passages at a rate determined by the extent of the movement of the spool from its neutral position during which time fluid may be returned from the motor through the other of the service passages to a return passage and in which a pressure compensating mechanism maintains the selected supply flow rate to one of the service passages and another pressure compensated valve mechanism maintains the selected return flow rate from the motor despite any variations in the load on the controlled motor or in the pressure being supplied to the control valve. In one direction of control of the motor one of the pressure compensating valve mechanisms acts to control the delivery of fluid and the other of the pressure compensating mechanisms acts to control the return of hydraulic fluid, and in the other direction of control the one pressure compensating mechanism acts to control the return and the other the delivery of fluid pressure. The pressure compensating mechanisms are incorporated within the control spool, thereby diminishing the size of the valve control body which may be required. The pressure compensating mechanisms also act as load holding valves in the event of failure of the supply fluid.

A control valve is provided which is adapted for use in a stack of valves, each of which can control a separate, independent function, such as a fluid motor, and in which the highest pressure demanded by any one of the valves is employed to control the pump unloading arrangement insuring an ample supply of fluid to the sectional valves. The valves also are arranged for either parallel control or for series parallel control. In the latter case, the operation of downstream sections of the assembly of control valves does not impose fluid loads on the series parallel control valve upstream of the valve being operated.

BRIEF DESCRIPTION OF THE DRAWINGS

FIG. 5 is a fragmentary sectional view illustrating the valve mechanism of FIGS. 1 and 2 embodies in a sectional valve assembly;

FIG. 6 is a fragmentary sectional view taken generally on line 6—6 in FIG. 5;

DETAILED DESCRIPTION

Figure 2:
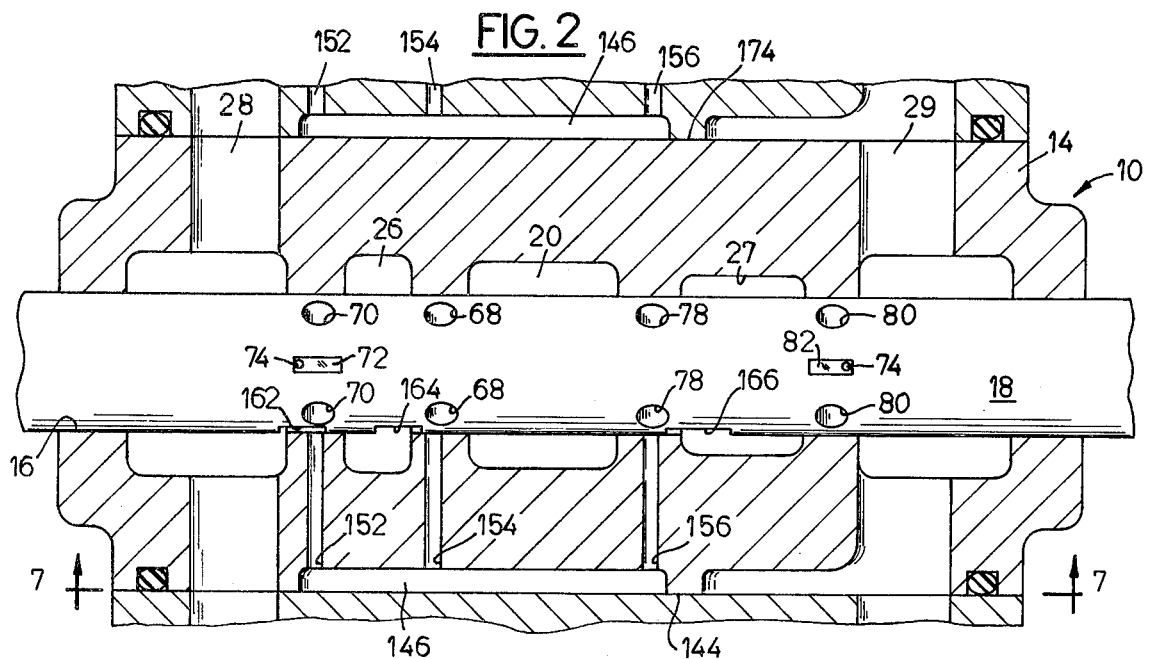
FIG. 2 is a cross sectional view of the pressure compensated control valve taken on line 2—2 in FIG. 1.
Figure 1:
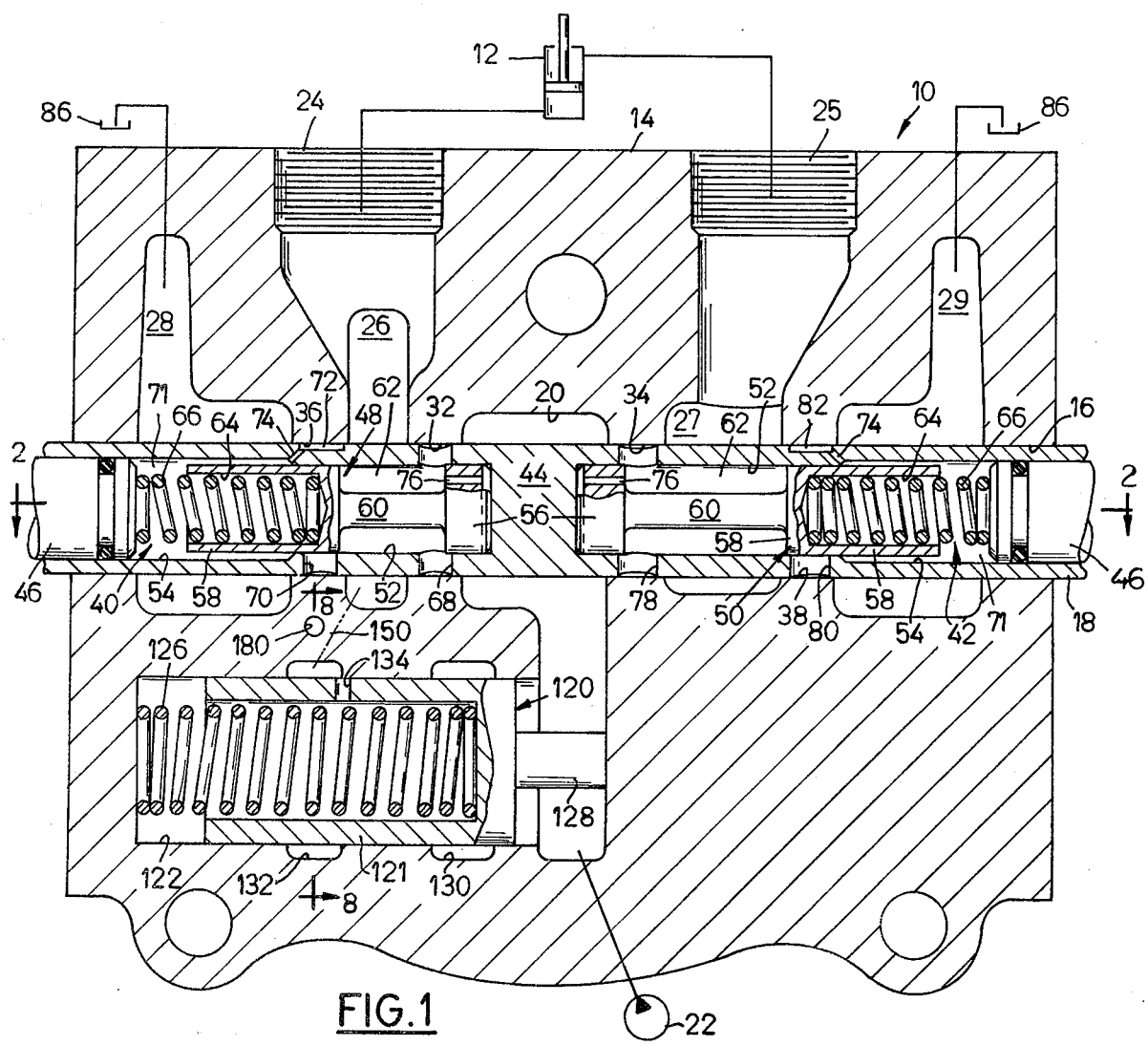
FIG. 1 is a diagrammatic cross sectional view of a pressure compensated control valve embodying the invention.

Referring to the drawings and particularly FIGS. 1 and 2 the numeral 10 designates a pressure compensated series-parallel type of control valve for governing the speed and direction of operation of a reversible hydraulic motor, here shown by way of example as a double-acting lift cylinder 12. The valve 10 is mounted in a valve body section 14 having a main bore 16 slidably receiving an elongated valve control rod or member 18. The valve 10 can be used alone or can make up one of the control sections of a stack or plurality of valves.

The valve control member 18 is axially slidably received in the bore 16 to govern the operation of the double-acting cylinder 12 by directing the flow of pressure fluid from a fluid inlet or feeder passage 20 which receives hydraulic fluid from a hydraulic pump indicated at 22 to one or the other pair of service ports or passages 24 and 25 open to service chambers 26 and 27, respectively, communicating with the bore 16 at axially opposite sides of the feeder passage 20. For purposes of illustration the service passage 24 has been shown connected with the head or load raising port of the cylinder 12 while the surface passage 25 has been shown connected with the rod or load lowering port of the cylinder 12.

A pair of exhaust or return chambers 28 and 29 join with the bore 16 at zones axially outwardly of the service chambers 26 and 27, respectively, and communicate with reservoir or return ports.

The valve bore 16 is provided with a pair of land portions 32 and 34 which are disposed at opposite sides of the feeder passage 20 and serve to engage the outer surface of the control member 18 and separate the feeder passage 20 from the service chambers 26 and 27, respectively, when the control member 18 is in its neutral position shown in FIGS. 1 and 2. The bore 16 also forms land portions 36 and 38 which engage the outer surface of the member 18 and separate service chamber 26 from return chamber 28 and service chamber 27 from return chamber 29. Opposite ends of the control member 18 engage opposite ends of the bore 16 to close the body section 14 to the atmosphere.

The valve control member 18 is generally tubular in configuration and is adapted to slide in the bore 16 with land portions 32, 34, 36 and 38 in engagement with the outer surface of the valve control member 18. The valve member 18 is provided with a pair of blind, stepped bores 40 and 42 extending towards each other from opposite ends of the member 18 and separated from each other by a center portion 44. The axially outer ends of each of the blind bores 40 and 42 are closed by plug members 46 which are positioned in sealing relationship to the bores 40 and 42 to form chambers containing a pair of pressure compensating valve plungers 48 and 50, respectively.

Referring now to the pressure compensating mechanism at the left end of the valve spool 18, as seen in FIG. 1, the stepped bore 40 has a reduced bore portion 52 and an enlarged bore portion 54. The plunger 48 is slidably disposed in the reduced bore portion 52 and includes a head portion 56 and a piston portion 58 joined together by a stem 60 to form an annular chamber 62 in the reduced bore portion 52. The piston portion 58 has a blind bore 64 which receives a spring 66 one end of which is seated against the end of the bore 64 and the other end against the plug 46 to continuously bias the plunger 48 into engagement with the center wall portion 44.

The reduced bore portion 52 communicates with the exterior of the valve spool 18 by way of a plurality of radially extending passages or openings 68. In the position shown in FIGS. 1 and 2 the openings 68 are closed by the land portions 32. The reduced bore portion 52 also communicates with the outer surface of the plunger 18 by way of a plurality of radially extending passages 70. In the position of the spool 18, shown in FIGS. 1 and 2, the outer ends of the radial passages 70 are closed by the land 36 of the bore 16 and the radially inner ends of the radial passages 70 are closed by the outer surface of the piston portion 58.

The enlarged bore portion 54 forms a chamber 71 which communicates with a seat or recess 72 formed in the outer surface of the valve member 18 through an angularly disposed passage 74. In the position shown in the drawings the recess 72 is closed by the land portion 36.

The head portion 56 of the plunger 48 is provided with an axially offset passage 76 which serves to communicate the chamber 62 with the reduced bore portion 52 formed between the head portion 56 and the center wall 44 of the spool.

The pressure compensating valve mechanism 50 at the right end of the spool 18 is identical in most respects to the pressure compensating valve mechanism 48 except that it moves in the opposite direction. Identical reference characters have been used to identify identical parts except that radial passages 68 and 70 and recess 72 associated with the plunger 48 at the left end of the member 18 correspond to radial passages 78 and 80 and to recess 82, respectively, associated with the right end of the member 18. In the position shown in FIGS. 1 and 2, the radial passages 78 are closed by the land portion 34 and the radial passages 80 and the recess 82 are closed by the land portion 38.

As seen in FIGS. 1 and 2, the spool 18 is in its neutral position and all of the ports 68, 70, 78 and 80 are closed preventing the delivery of hydraulic fluid from the pump 22 to the hydraulic cylinder 12. Under such conditions hydraulic fluid from the pump 22 must be bypassed to a reservoir 86 which, as seen in FIG. 6, is under the control of an inlet valve section designated generally at 88. The inlet valve section 88 includes a plunger member 90 slidable in a bore 92 which is closed at one end and has its opposite end open to a cavity 94 which communicates directly with the feeder passage 20. The plunger 90 is provided with a blind bore 96 which receives the spring 98 having one end seated against the end of the blind bore 96 in the plunger 90 and its opposite end seated against the closed end wall of the bore 92. The spring 98 serves to urge the plunger 90 to the left in the absence of any pressure influence to seat a stem 100 against the side wall of the cavity 94. The bore 92 to one side of the cavity 94 is enlarged to form a reservoir cavity 102 which communicates with the reservoir 86. Another cavity 104 is formed to the right of the cavity 102 and remains in constant communication with a chamber 106 in the bore 92 to the right of the plunger 90 by way of a radial passage 108. The cavity 104 and, therefore, the chamber 106 receives a signal pressure depending on the operating condition of the valve 10 as will be more fully described later, which is opposed by pump pressure to the left of the plunger 90. These pressures determine the position of the plunger 90 and in the neutral position of the valve shown in FIGS. 1 and 2, the signal pressure in the chamber 106 will be at a minimum so that the plunger 90 assumes a pump unloading position in which substantially all of the fluid entering the cavity 94 from the pump 22 is delivered to the cavity 102 and to the reservoir 86.

Figure 3:
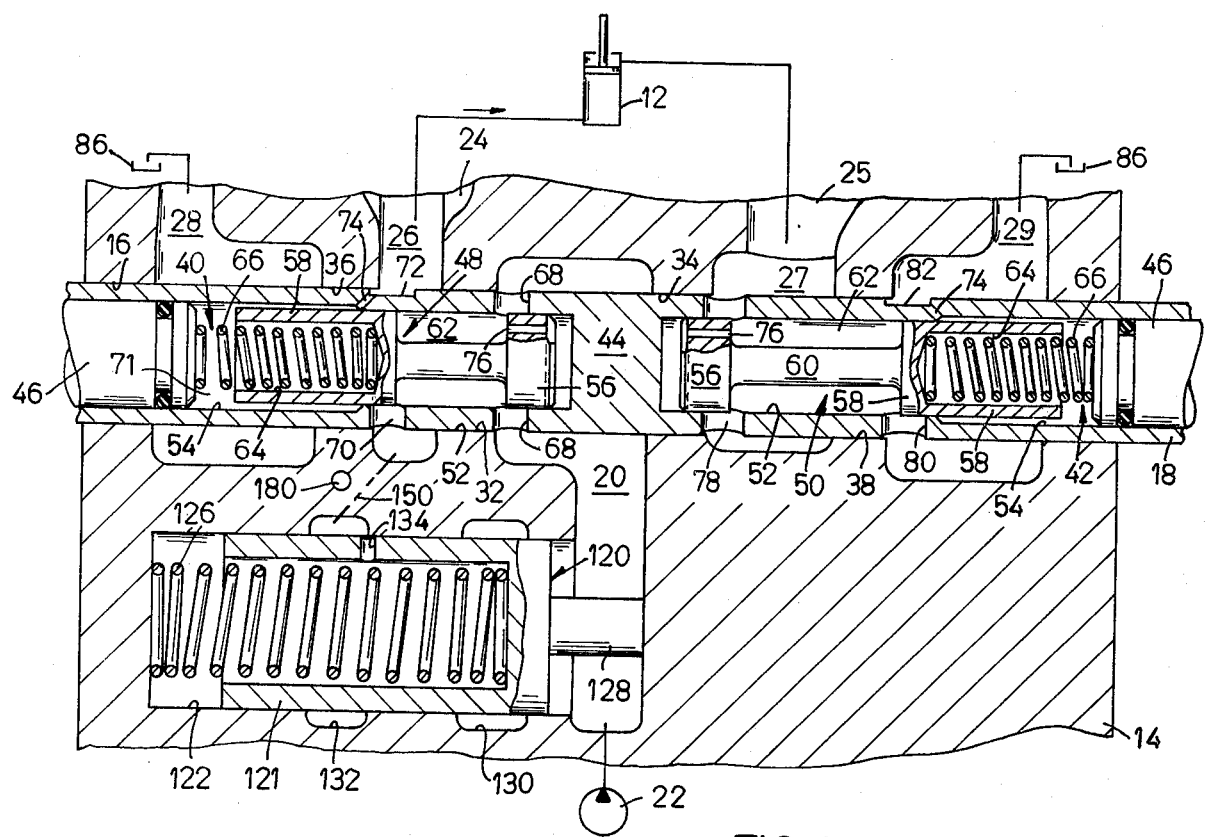
FIG. 3 is a view similar to FIG. 1 but showing operation of the valve in a load raising direction.

Shifting of the valve spool 18 from the neutral position in which it is shown in FIGS. 1 and 2 to the position in which it is shown in FIG. 3, that is to the right of its neutral position, serves to deliver hydraulic fluid from the pump 22 by way of the cavity 94 and the feeder passage 20 to the radial passages 68 which have moved axially of the land portion 32 to admit hydraulic fluid to the annular chamber 62 formed in the reduced bore portion 52. The pressure of fluid in the annular chamber 62 acts to the left on the piston portion 58 to overcome the biasing action of the spring 66 so that the piston 58 opens the radially inner end of the passages 70 permitting communication of hydraulic fluid from the annular chamber 62 to the service chamber 26 and to the service passage 24. Hydraulic fluid from the service passage 24 is communicated to the head end of the hydraulic cylinder 12 to cause an extension of the latter.

The pressure of hydraulic fluid which is communicated to the service passage 24 also is communicated through the open recess 72 and the angular passage 74 to the chamber 71 formed in the enlarged bore portion 54 to the left of the plunger 48. The pressure of fluid in the chamber 71 together with the force of the springs 66 act to the right in opposition to the pressure of hydraulic fluid in the annular chamber 62 to determine the position of the head portion 56 relative to the radial passages 68. The spring 66 is selected to be of some predetermined value. For example, to exert a force equal to 50 psi of pressure. As a consequence, the opposing pressure in the chambers 71 and 62 will serve to move the plunger 48 relative to the radially inner end of the passages 68 to maintain the pressure in chamber 62, 50 psi higher than the pressure delivered from the service port 24. Fluid from the chamber 62 is metered through the radial passage 70 which is partially opened relative to the land 36. The pressure in the service passage 24 is the working pressure of the hydraulic cylinder 12 which is made manifest through the passages 74 to the left side of the plunger 48 so that the flow of fluid is metered in accordance with the variations in pressure drop between the annular chamber 62 and the service passage 24 which are made manifest at opposite sides of the piston portion 58 of the plunger 48. Stated in another way, the compensating plunger 48 can be said to be automatically adjustable in response to the difference in pressure acting in opposite directions to maintain a uniform pressure drop across the metering passage 70 between the annular chamber 62 and the service passage 24 which corresponds to the desired speed of cylinder operation as determined by the metered setting or displacement of the valve member 18 from its neutral position.

At the same time that fluid is being delivered from the service passage 24 to the head end of the hydraulic cylinder 12 the movement of the piston in the cylinder serves to exhaust hydraulic fluid to the service port 25. The exhausted fluid in the service port 25 is subject to the control of the pressure compensating plunger 50 associated with the right end of the control member 18. Pressure in the service port 25 passes to the service chamber 27 and through the partially open radial port 78 which has moved to the right of the land portion 34 so that the exhausting pressure becomes established in the annular chamber 62 of the pressure compensating mechanism 50. The pressure at the extreme right end of the piston portion 58 of the plunger 50 is that of the reservoir 86 because of the communication through the exhaust or return passage 29 through the angular passage 74 and the slot or recess 82. The reservoir pressure will be less than the pressure being exhausted from the motor 12 and will be established in the annular chamber 62 so that the plunger 50 moves to the right against the action of the spring 66 to open the radial passage 80.

The compensating plungers 48 and 50 will be axially adjusted to whatever position effects a balance between the forces on the opposite ends of the plungers and at which position the pressure drop between the chamber 62 and the service passages 24 and 25 through the passages 70 and 80, respectively, can be said to correspond to the desired speed of motor operation as determined by the axial position of the control spool 18.

Any sudden increase in pressure which may occur in the feeder passage 20 does not affect the selected delivery of fluid to the service ports 24 or 25 as determined by the distance that the valve member 18 has been displaced relative to its neutral position. If, for example, the pressure at the service port 24 has been 1,000 psi, the same pressure will be established in the chamber 71 to the left of the pressure compensated plunger 48. This pressure, together with the spring 66 exerting a force equal to 50 psi of fluid pressure will be balanced by a pressure in the annular chamber of 1,050 psi. Under these conditions, if the pressure in the feeder passage 20 should increase substantially, for example by several hundred psi, as a result of operation of other valve sections which will be described later, the compensating plunger 48 will respond to the increase in pressure and will be urged to the left to decrease the opening of the annular passages 68 to maintain the preselected pressure differential in chambers 62 and 72 and, therefore, the pressure differential between the chamber 62 and the service port 24. In this manner pressure compensated plunger 48 serves to insure fluid flow to the service port 24 at a value determined by the position of the control member 18 independently of any sudden increases in pressure in the feeder passage 20.

Referring now to FIG.. 4, when the valve control member 18 is moved from its neutral position to the left in a load lowering direction of the actuator 12, fluid pressure is supplied from the feeder passage 20 through the pressure compensating mechanism 50 to the rod end of the actuator 12 by way of the service passage 25. At the same time, fluid is exhausted from the head end of the motor 12 through the service passage 24 and through the pressure compensating mechanism 48 to the return port 28.

In the lowering direction of the load, the hydraulic cylinder 12 is subjected to the gravitational forces of the load acting thereon as well as the pressure of the hydraulic fluid being delivered from the service passage 25 to the rod end of the cylinder 12. If it is assumed that the load on the cylinder 12 is extremely heavy, the load will serve to increase the pressure in the service passage 24 and therefore in the annular chamber 62 of the pressure compensating mechanism 48. The increase in pressure in the chamber 62 will overcome the lower reservoir pressure acting to the left of the piston portion 58 and also the force of the spring 66 in accordance with the pressure established in the annular chamber 62. Since the latter pressure is a product not only of the pressure being delivered from the service passage 25 to cause the cylinder 12 to move in the load lowering direction, but also to the load imposed on the hydraulic cylinder 12, the piston 58 will move to the left to decrease the opening of the radial passages 68 and thereby limit pressure in the chamber 62 to reestablish the required pressure differential acting on the plunger 48. As a result, a constant pressure drop will be maintained between the service passage 24 through the passage 70 to the return chamber 28 in accordance with the selected position of the valve member 18.

Sectional Valves

As previously pointed out, the control valve 10 embodying the principles of this invention may be used separately or together in a multisectional control valve as illustrated in FIGS. 5 and 6. The multisectional control valve may include by way of example, four superimposed control sections arranged in a stack or bank between the inlet valve section 88 and an outlet section 110, respectively. The sections 111, 112, 113 and 114 may be substantially identical to the control valve mechanism 10 illustrated in FIGS. 1 and 2. In the example illustrated in FIGS. 5 and 6, sections 111 and 112 are modified to accommodate series parallel control and sections 113 and 114 are arranged for parallel control.

The valve sections 111 and 112, which are arranged for series parallel operation are identical to the valve 10 shown in FIG. 1. For such operation each valve 10 includes a poppet valve indicated generally at 120 which includes a piston portion 121 slidably mounted in a bore 122. The bore 122 is closed at one end by the housing body 14 and its other end is open to the feeder passage 20. The piston 121 is open ended and receives a spring 126 having one of its ends engaging the piston 121 and the opposite end seated against the wall of the bore 122. The spring 126 urges the piston 121 to the right so that a rod or stem portion 128 engages a wall in the feeder passage 20 to limit the extent of movement of the piston 121 toward the right.

The bore 122 has an enlarged portion forming a chamber 130 which communicates with the feeder chamber 20 of the adjacent, downstream valve section as best seen in FIG. 6. Referring back to FIG. 1, the bore 122 forms another enlarged portion which forms an annular chamber 132. The latter chamber 132 is in constant communication with a radial passage 134 in the piston portion 121 for all axial positions of the latter in the bore 122. Chamber 132 is subject to pressure reflecting the operating condition of the valve that is, in the neutral position of the valve control member 18, pressure in the chamber 132 would be at reservoir pressure and when the valve spool 18 is moved to either side of its neutral position, the pressure in the chamber 132 is proportional to the working pressure established at the service ports 24 or 25. As a consequence, opposite sides of the piston 121 are subject to the differential of pressure in the feeder passage 20 and in the annular passage 132 to position the poppet 120 in a position determined by that pressure differential. For example, with valves 10 of valve sections 111 and 112 in their neutral position the pressure to the left of the piston portion 121 of the poppets 120 will be at a minimum and as a consequence, the pump pressure in the feeder passage 20 will move the poppet 120 to the left to open the feeder passage 20 to the feeder passage 20 of the adjacent downstream valve section as best seen in FIG. 6.

Figure 7:
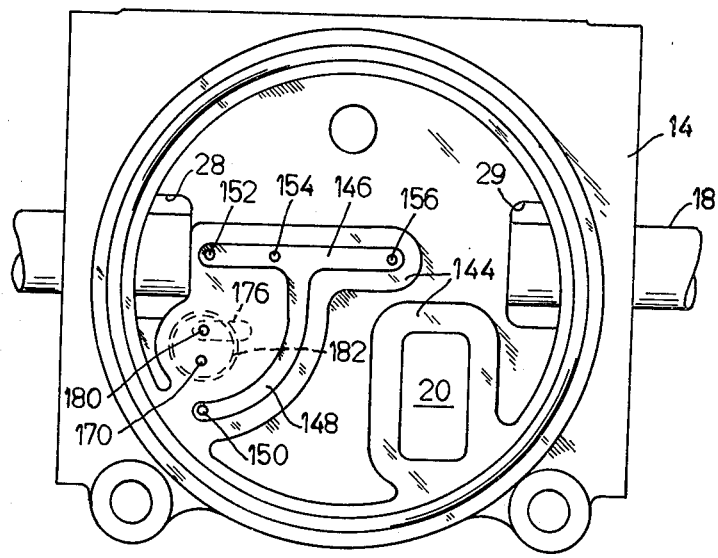
FIG. 7 is a view taken generally in the direction of line 7—7 in FIG. 2.
Figure 8:
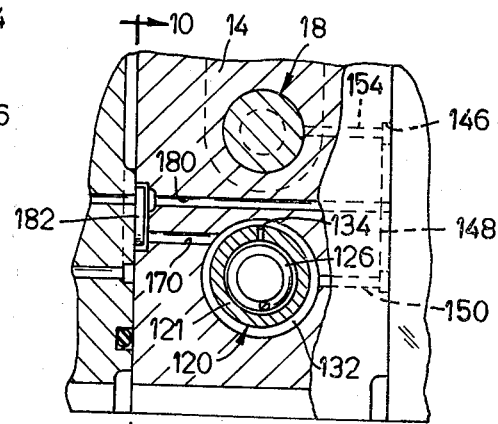
FIG. 8 is a partial cross sectional view taken generally on line 8—8 in FIG. 1 but at a reduced scale.

Communication of pressure from the valve sections to the chamber 132 will best be understood by a reference to FIGS. 2 and 7. A face 144 of the valve body 14 is provided with an elongated slot 146 which extends in generally parallel relationship to the axis of the valve member 18 and to one side of the bore 16. As seen in FIG. 7, the elongated slot 146 communicates with an arcuate slot 148, the extreme lower end of which communicates with one end of a passage 150. The opposite end of passage 150 communicates with the annular chamber 132 which can best be seen in FIGS. 1 and 8.

Figure 4:
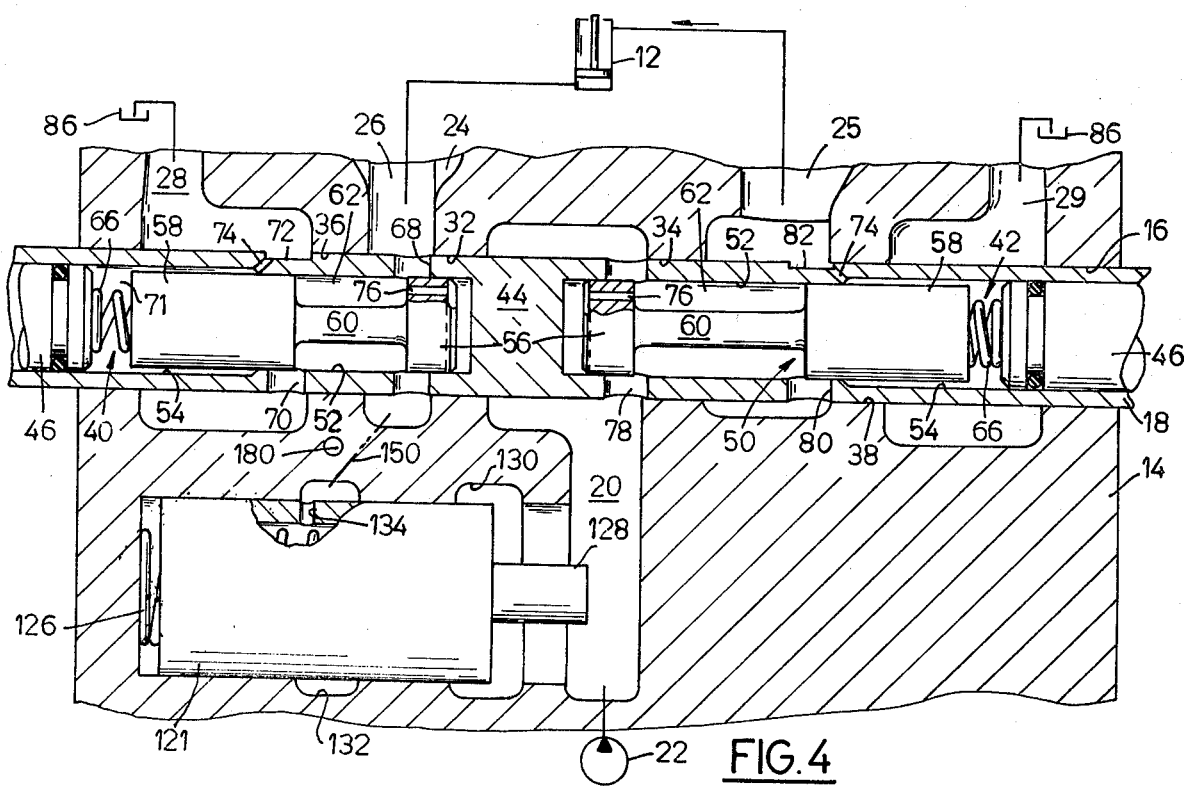
FIG. 4 is a view similar to FIG. 3 but showing operation of the control valve in a load lowering direction.

Referring now to FIG. 2, the elongated slot 146 in the face of the body 14 communicates with one end of a plurality of passages 152, 154 and 156, the opposition ends of which communicate with the bore 16 slidably supporting the valve control member 18. The passages 152, 154 and 156 are under the control of slots or recesses 162, 164 and 166, respectively, formed in the outer surface of the valve member 18. In the neutral position of the control spool 18, as seen in FIG. 2, the recess 162 places the passage 152 in communication with the return chamber or passage 28 while the passages 154 and 156 remain closed by the outer surface of the valve member 18. This position serves to vent the elongated passage 146 to the return passage 28 and also to vent the chamber in the bore 122 at the left side of the piston 121 to the reservoir by way of the annular chamber 132, passage 150, the arcuate slot 148, as seen in FIG. 7. As a consequence, the pressure at the left of the piston 121 will be at reservoir pressure or at a minimum, and the pressure at the right will be at the pressure supplied from the pump to the feeder passage 20. This creates a pressure differential which moves the piston 121 to the left, as seen for example in FIG. 4, to expose the feeder passage 20 to the chamber 130 which is in communication with the feeder passage 20 of the next adjacent valve section.

When the valve member 18 is moved to the right from its neutral position, shown in FIG. 2, recess 162 will be closed to the return chamber 28 and the recess 164 will be placed in communication with one end of the passage 154. At the same time the passage 156 will be closed by the outer surface of the valve spool 18. With the valve member 18 in this position, pressure will be delivered to the service port 24 by way of the service chamber 26 which communicates this pressure through the passage 154 to the slot 146, to the arcuate slot 148 and to passage 150 and the control chamber 132. As a consequence, the working pressure in the service passage 24 is made manifest in the control chamber 132 of the poppet mechanism 120.

If the valve member 18 is moved to the left from its neutral position shown in FIG. 2 the slot 166 will be placed in communication with the passage 156 while the passages 154 and 152 remain closed. In this position the working pressure in the service passage 25 is made available in the passage 156 and slot 146, seen in FIG. 2, and through the arcuate slot 148 to the passage 150, seen in FIG. 7. Pressure from the passage 150 is communicated to the control passage 132. Consequently, any time that the valve spool 18 is moved from its neutral position, working pressure at either the service port 24 or at the service port 25 is made available in the elongated slot 146 and ultimately to the annular chamber 132. Such working pressure at the left side of the piston 121, together with the biasing of the spring 126, serves to move the poppet piston 121 toward the right so that the piston 121 assumes a position delivering sufficient fluid to the feeder passage 20 to supply the valve section being operated. If the valve member 18 is moved to a maximum open position and if all of the fluid which can be supplied by the pump is being utilized by that particular valve section, the valve piston 121 will move to the right completely closing off communication between the feeder passage 20 and the chamber 130 to downstream valve sections. As a consequence, hydraulic pressure from the feeder passage 20 will not be made available for operation of any of the valve sections downstream of the valve section 111.

Figure 10:
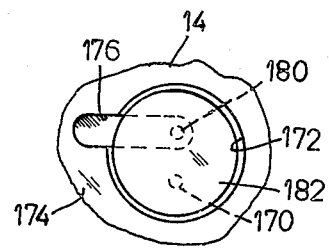
FIG. 10 is a view at an additionally enlarged scale taken generally in the direction of line 10—10 in FIG. 8.
Figure 9:
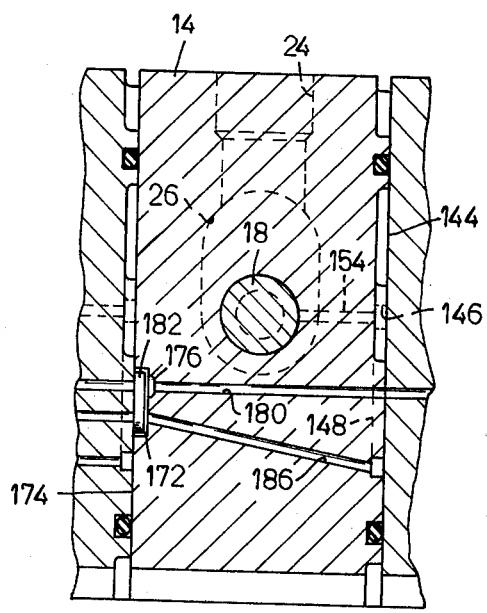
FIG. 9 is a cross sectional view similar to FIG. 8 but showing a portion of a modified control valve.

Referring now to FIG. 5, the control pressure which is made available in the annular chamber 132 of the poppet arrangement 120 in the valve section 111 also is communicated through a passage 170 to a cavity 172 formed in a face 174 of the valve section 111. As seen in FIG. 10, the cavity 172 is circular and a bottom portion thereof is open to an elongated slot 176 which extends beyond the outer circumference of the circular cavity 172. The slot 176 communicates with an elongated passage 180 which extends between the valve faces 144 and 174. As seen in FIG. 5, the passage 180 is placed in communication with the pilot chamber 104 in the inlet valve section 88. As seen in FIG. 5, the circular recess 172 communicates with another passage 180 in the adjacent valve section 112.

The recess 172 in section 111 receives a disc valve element 182. In the position shown in the drawing the disc element 182 serves to close the passage 180 in the valve section 112 while the passage 180 in the valve section 111 remains in communication through the cavity 172 with the passage 170 and the annular chamber 132 associated with the poppet section 120. As a consequence, pressure which is made available to the left of the piston portion 121 in the valve section 111 also is made available in the inlet valve section 88 to control the bypass of fluid from the pump 22 to the reservoir 86.

The valve section 112 is identical to the valve section 111. However, the valve sections 113 and 114, which are intended for parallel operation, are different from the valve sections 111 and 112 in that the poppet sections 120 are omitted. Instead, the cavities 172 of the last two sections are placed directly in communication with the arcuate slot 148 by an angularly disposed passageway 186. Cavity 172 in the last valve section 114 does not require a disc valve element 182 such as used with the sections 111, 112 and 113.

The interconnected passages 180 and the cavities 172 in each of the valve sections communicate with the annular control chamber 104 in the inlet valve section 88 in such a manner that the pressure in the annular chamber 104 will reflect the highest working pressure to which any of the valve sections are being submitted. For example, if only the valve section 113 is being operated, pressure in the arcuate slot 148 will reflect the working pressure at either of the service ports 24 or 25 of that particular valve section, and such pressure will be communicated through the angular passage 186 to the circular cavity 172 of section 113. Since the pressure in the passage 180 of the adjoining section 114 will be at reservoir pressure, the disc valve element 182 will be moved to the position in which it is shown in FIG. 5 to close the passage 180 to the valve section 114. Pressure, however, will be communicated from the circular cavity 172 in the section 113 to the passages 180 in the valve section 113. This pressure will serve to move the valve element 182 in section 112 against the bottom of that cavity. However, pressure will be free to communicate around the periphery of the valve element 182 to the slot portion 176 in communication with the passage 180 of the valve section 112. In a similar manner, the passage 180 in the valve section 112 communicates with the passage 180 in the valve section 111 and, therefore, with the control chamber 104 in the inlet section 88. Subsequently, if one of the other valve sections should be operated to develop a higher working pressure in its associated passage 180, that pressure will be communicated to the annular control chamber 104 of the inlet valve section 88 to control the bypass of fluid from the pump 22 to the reservoir 86. In this manner, the pressure in the control chamber 104 always reflects the highest working pressure developed at any of the valve sections 111 through 114.

Operation

Each valve section can be employed to operate a separate hydraulic motor such as the double acting actuator 12 seen in FIG. 1, or if preferred, a rotatable hydraulic motor (not shown).

If all of the valve spools 18 of the four valve sections are in their neutral position, the plunger 90 of the inlet valve section will be urged upwardly as seen in FIG. 6 and hydraulic fluid will be bypassed from the pump 22 to the reservoir 86. Upon actuation of any one of the control valve members 18 of any one of the valve sections 111 through 114, the working pressure to the associated valve actuator or motor will be established in the control cavity 104, causing the plunger 90 to move downwardly to close off the bypass of some of the fluid from the pump 22 to the reservoir and to insure delivery of fluid to the feeder passages 20 of the valve section being operated. If two or more valve spools 18 are being operated, the highest working pressure to which any one of the valve sections is subjected will be established in the annular chamber 104 to control the plunger 90 of the inlet section 88.

In the case of operation of the series parallel valve sections 111 and 112 the working pressure at the associated service ports 24 or 25 also is employed to position the poppet members 120. If, for example, the valve section 112 is being operated, the poppet plunger 120 will be positioned to insure adequate flow for operation of the valve section 112 and the balance of the fluid will be bypassed to the downstream valve sections 112 and 113 for use by those valve sections. During the time that the valve section 112 is being operated to demand fluid flow, actuation of the upstream valve section 111 to demand some lower working pressure, positions the associated valve poppet 120 to insure sufficient fluid flow in the feeder passage 20 of the valve section 111 for operation of that valve. The inlet section 88, however, will be under the influence of the higher working pressure from the downstream valve section and the remainder of fluid from the pump 22 which is not used by the upstream valve section 111 will be bypassed to the chamber 130 and to the feeder passage 20 of the downstream valve section 112.

As previously pointed out, the movement of the valve member 18 of any one of the valve sections from its neutral position to the right, as shown for example in FIG. 3, will serve to deliver pressure from the associated feeder passage 20 through the pressure compensating mechanism 48 to the service passage 24 and to the associated actuator 12. At the same time fluid will be exhausted from the actuator 12 from the opposite side of the piston to service passage 25 through the pressure compensating mechanism 50 and to the reservoir 86. In this manner, the delivery of fluid pressure is pressure compensated by the plunger 48 and at the same time the exhaust or return of fluid is pressure compensated by the plunger 50.

In a similar manner, movement of any of the four plungers 18 associated with the four valve sections will serve to deliver pressure to the associated service port 25 for pressure modulation by the plunger 50 and to exhaust pressure from the service port 24 for pressure modulation by the plunger 48.

In the event of failure of supply fluid in the feeder passage 20 associated with any one of the valve sections, for example, in the event of failure of the pump 22 to deliver fluid pressure, the pressure compensating mechanisms 48 and 50 act as load holding valves. With the valve member 18 to the right of its neutral position, as shown in FIG. 3, there will be a minimum pressure in the annular chamber 62 to the right of the piston portion 58 of the pressure compensating plunger 48. The pressure to the left of the piston portion 58, however, will be at the load pressure of the hydraulic cylinder 12 and will be made manifest in the service passage 24 and service chamber 26. This pressure will be made available in the chamber 71 and will be higher than the pressure in the chamber 62 and will cause the pressure compensating plunger 48 to be moved to its extreme right position in the bore 54 in which it is shown in FIG. 1. In that position the radially inner end of the valve port 70 will be closed by the piston portion 58 to prevent fluid flow from the service passage 24 to the feeder passage 20 and to the disabled pump 22. In a similar manner, the pressure compensating plunger 50 in the right end of the valve member 18 will be moved to its extreme left position, as shown in FIG. 1, because fluid pressure will no longer be forced from the hydraulic motor 12 to the service passage 25. As a consequence, differential in fluid pressure in the chambers 62 and 72 at opposite sides of the piston portion 58 will be substantially less than the force exerted by the spring 66. The spring 66 will therefore urge the pressure compensating plunger 50 to its extreme left position in which the piston portion 58 will serve to close the radially inner end of the valve port 80. In this manner the piston portions 58 of the pressure compensating valve plungers 48 and 50 act as load holding valves in the event of failure of pressure from the pump 22 to the feeder passages 20.

A control valve has been provided in which the delivery of hydraulic fluid to the working end of a hydraulic motor is under the control of a pressure compensating mechanism which regulates the speed of movement in a working direction, and at the same time the exhaust of fluid from the opposite end of the hydraulic motor is under the control of another independently operated pressure compensating mechanism which insures that the speed of movement of the hydraulic motor which is being controlled is maintained uniformly independently of any load that may be imposed on the motor. The valve arrangement is suitable for use in a control valve of sectional construction which can be made up of a number of parallel, series parallel or combination series and series parallel control sections arranged at random in the bank.

I claim:

1. A control valve comprising, a housing having an inlet port, a service port and a return port communicating with a source of fluid pressure, with apparatus to receive hydraulic fluid for operation thereof and with a reservoir, respectively, a valve member movable axially in said housing and having a chamber formed therein, first and second passage means communicating with each other through said chamber, said member having a neutral position in which said first and second passage means are closed to said ports and being movable in a first direction to place said first passage means in communication with said inlet port and said second passage means in communication with said service port and in a second direction to place said first passage means in communication with said service port and said second passage means in communication with said return port, pressure compensating means disposed in said chamber and including a pressure responsive plunger responsive to differential pressure in said chamber and said service port when said member is moved toward said first position and responsive to pressure differential in said chamber and said return port when said member is moved in said second direction, said pressure differential being operative to move said pressure responsive plunger towards a position varying the opening of said first passage means to maintain said pressure differentials constant.

2. The combination of claim 1 in which said plunger closes said second passage means in the neutral position of said valve member.

3. The combination of claim 1 in which said plunger is movable in response to the failure of pressure at said inlet port when said valve is in one of said operating positions to close said second passage means.

4. The combination of claim 1 in which said second passage means is operative to restrict flow therethrough in accordance with the distance that said valve member has been moved from said neutral position toward said first and second positions.

5. The combination of claim 1 in which said plunger forms a chamber between said passage means, an auxiliary chamber to one side of said plunger, said auxiliary chamber being in communication with said service port when said member is in said first position and with said return port when said member is in said second position.

6. A control valve comprising, a housing having a fluid inlet, a pair of fluid service passages and a fluid return passage, a valve member in said housing shiftable in opposite directions from a neutral position isolating said inlet from both said service and return passages toward one or the other of a pair of operating positions in which said inlet communicates with a selected one of said service passages and the other of said service passages communicates with said return passage, a pair of chambers formed in said control valve member and being isolated from each other, said valve member including means to direct fluid flow from said inlet through one of said pair of chambers to one of said service passages serially through first and second control openings and from the other of said service passages through the other of said pair of chambers to said return passage serially through third and fourth control openings, the size of said second and fourth control openings being determined by the extent of movement of said valve member from its said neutral position towards one of said operating positions, a pair of pressure compensating means disposed in said pair of chambers, respectively, and each having a pressure responsive portion for automatically decreasing the size of said first and third openings to decrease the pressure in said chambers in response to an increase in pressure differential between one of said chambers and said service ports through said second opening and between the other of said chambers and said return port through said fourth opening.

7. The combination of claim 6 in which said pressure compensating means include a plunger slidable in each of said chambers and means continuously biasing said plungers in a direction to increase the size of said first and third openings.

8. The combination of claim 7 in which said plungers are movable in response to absence of pressure at said inlet to close said second and fourth control openings.

9. A sectional control valve comprising: a plurality of valve assemblies sandwiched in abutting relation to each other in a bank between a pair of end sections; one of said end sections forming an inlet section having inlet, supply and bypass passages; a plunger regulating the flow of supply fluid from said inlet to said supply and bypass passages; each of said valve assemblies including a housing forming a feeder passage communicating with said supply passage, a service passage and a return passage; a valve member movable in each of said housings from a first position isolating said feeder and service passages toward a second position communicating said feeder and service passages; said control members each having a chamber formed therein, first passage means associated with each chamber and communicating the latter with the associated one of said feeder passages, second passage means communicating each of said chambers with the associated service passage when said valve member is in said second position, a pressure compensating means supported in each of said chambers, means biasing each of said pressure compensating means to a position opening said first passage means, said pressure compensating means being responsive to a pressure in said feeder passages greater than at said service passages to restrict the size of said first passage means to maintain pressure from the associated feeder passage to the corresponding chamber at a predetermined level, each of said second passage means determining the flow of fluid from the associated chamber to said outlet in proportion to the displacement of said valve member from its first position, means communicating said service passages of all of said valve assemblies to one side of said plunger in said inlet section for regulating bypass of fluid pressure from said inlet to said supply passage.

10. The combination of claim 9 in which at least one of said valve assemblies includes passage means to an adjoining valve assembly, a fluid flow control mechanism disposed in said passage means and being responsive to the differential in pressure in said feeder passage and service passage of said one of said valve assemblies to position said flow control mechanism in a position restricting flow to said adjoining valve assembly.

11. A control valve of the type having a valve member which is shiftable towards each of a pair of operating positions at opposite sides of a neutral position to direct pressure fluid from an inlet passage to one or the other of a pair of service passages comprising: means directing fluid pressure flow to either service passage to pass serially through first and second variable orifice means, the fluid pressure flow through said second orifice means being determined by the extent to which the valve member is shifted from neutral, said valve member including a first chamber defined therein and a first pressure responsive plunger confined within said chamber and axially movable therein for automatically adjusting the size of said first orifice means, said plunger being acted upon by pressure of fluid at the downstream side of the second orifice means to be urged in a direction to increase the size of said first orifice means, spring means acting on said first plunger to urge the latter in said direction increasing the size of said first orifice, and means for translating the pressure fluid at the upstream side of said second orifice into a force on the plunger tending to move the latter in opposite direction to decrease the size of said first orifice.

12. The control valve of claim 11 wherein said first and second orifice means communicate with said chamber.

13. The control valve of claim 12 in which said plunger is slidably mounted in said chamber.

14. The control valve of claim 11 and further comprising valve means formed by said plunger to close said second orifice means in response to failure of fluid pressure at said inlet.

15. The control valve of claim 11 wherein said valve member is movable to a position directing fluid pressure returning to the other of said service passages to a return passage, said member forming a second chamber therein, additional means directing pressure fluid to pass serially through third and fourth variable orifice means, said second chamber including a second pressure compensating plunger confined within said chamber and axially movable therein for automatically adjusting the size of said third orifice, said second plunger being acted upon by pressure of fluid at the upstream side of said third orifice to urge said second plunger in a direction to decrease the size of said third orifice.

16. The control valve of claim 15 in which said plungers are movable independently of each other.

17. The control valve of claim 15 in which said valve member forms a pair of chambers isolated from each other, said plungers being independently slidably mounted in said chambers, respectively.

18. A control valve having a body with a valve member shiftable to a selected operating position at either side of a neutral position at which fluid is directed from a fluid pressure inlet passage to a selected one of a pair of service passages, means communicating fluid from said inlet to said selected one of said service passages serially through first and second variable orifices, a chamber formed in said valve member and communicating said first and second orifices, said second variable orifice through which pressure fluid flow from said chamber to a selected one of said service passages regulating the flow of fluid in an amount depending upon the extent of movement of said valve member from said neutral position, a compensating valve mechanism for automatically adjusting the fluid flow through said first variable orifice, said compensating valve mechanism including a pressure responsive plunger slidable in said chamber to automatically enlarge and contract said adjustable orifice depending upon the direction in which said compensating plunger is moved, biasing means urging said plunger in the direction to enlarge said adjustable orifice, means for translating pressure of fluid established downstream from said second orifice into force on the plunger tending to move the latter in a direction to enlarge said first adjustable orifice, and means for translating pressure of fluid obtained upstream from said second orifice into a force on said plunger tending to move it in a direction to restrict said first orifice.

19. The combination of claim 18 in which said plunger is slidably supported in said chamber.

20. The combination of claim 19 in which means biasing said plunger is a spring urging said plunger with a predetermined force and in which the pressure obtained upstream of said second orifice and in said chamber is maintained at a constant to equalize said predetermined force.

* * * * *